United States Patent
Park

(10) Patent No.: US 12,386,360 B2
(45) Date of Patent: Aug. 12, 2025

(54) DEVICE AND METHOD FOR CONTROLLING PLATOONING

(71) Applicant: HYUNDAI MOBIS CO., LTD., Seoul (KR)

(72) Inventor: Ge O Park, Seoul (KR)

(73) Assignee: Hyundai Mobis Co., Ltd., Seoul (KR)

(*) Notice: Subject to any disclaimer, the term of this patent is extended or adjusted under 35 U.S.C. 154(b) by 273 days.

(21) Appl. No.: 17/954,612

(22) Filed: Sep. 28, 2022

(65) Prior Publication Data

US 2023/0123121 A1    Apr. 20, 2023

(30) Foreign Application Priority Data

Oct. 19, 2021    (KR) .................. 10-2021-0139658

(51) Int. Cl.
  *G05D 1/00* (2024.01)
  *G08G 1/00* (2006.01)

(52) U.S. Cl.
  CPC ......... *G05D 1/0295* (2013.01); *G05D 1/0223* (2013.01); *G08G 1/22* (2013.01)

(58) Field of Classification Search
  CPC ....... G05D 1/0295; G05D 1/0223; G08G 1/22
  See application file for complete search history.

(56) References Cited

U.S. PATENT DOCUMENTS

| | | |
|---|---|---|
| 2019/0179338 A1 | 6/2019 | Kim |
| 2019/0196501 A1 | 6/2019 | Lesher et al. |
| 2019/0206262 A1 | 7/2019 | Sin |
| 2021/0174687 A1* | 6/2021 | Sasmal ............... G05D 1/0293 |
| 2024/0046798 A1* | 2/2024 | Oara ................... G05D 1/0293 |

OTHER PUBLICATIONS

Extended European Search Report issued in corresponding European Patent Application No. 22196086.7 dated Feb. 24, 2023.

* cited by examiner

*Primary Examiner* — Michael D Lang
(74) *Attorney, Agent, or Firm* — Morgan Lewis & Bockius LLP

(57) ABSTRACT

Proposed is a device for controlling platooning, the device including a processor that detects a travel environment state for the platooning, detects weights or loading rates of vehicles to be participating in the platooning, determines an arrangement order of a line of the vehicles of the platooning based on the detected travel environment state and the detected weights or loading rates, and sets a vehicle spacing of the platooning based on the arrangement order, and a communication device for transmitting information on the arrangement order and the vehicle spacing.

14 Claims, 5 Drawing Sheets

DEVICE AND METHOD FOR CONTROLLING PLATOONING

Pursuant to 35 U.S.C. § 119(a), this application claims the benefit of Korean Patent Application No. 10-2021-0139658, filed on Oct. 19, 2021, which is hereby incorporated by reference as if fully set forth herein.

BACKGROUND

Field

The present disclosure relates to a device and a method for controlling platooning, and more particularly, to a device and a method for controlling platooning in consideration of platooning vehicles or environmental factors.

Discussion of the Related Art

Platooning is a technology that performs autonomous driving in a state in which a number of vehicles are arranged in a line at a specified spacing. During the platooning, a leading vehicle, which is a vehicle positioned at the forefront of a platooning line, may control one or more following vehicles following the leading vehicle. The leading vehicle may maintain the spacing between a number of vehicles included in the platooning line, and behavior and situation information of a number of vehicles included in the platooning line may be exchanged using vehicle-to-vehicle communication.

However, in the case of the platooning, there is a high possibility of great human life or property damage when a traffic accident occurs. In particular, in a case of platooning of trucks, a possibility of secondary accidents is high as a load falls onto a road.

Therefore, there is a need for a platooning control technology that may minimize a possibility of the traffic accident or minimize damage even when the accident occurs in the platooning.

SUMMARY

The present disclosure is to propose a platooning control technology that may minimize a possibility of a traffic accident that may occur in platooning or minimize damage even when the accident occurs.

The technical problems to be solved by the present disclosure are not limited to the aforementioned problems, and any other technical problems not mentioned herein will be clearly understood from the following description by those skilled in the art to which the present disclosure pertains.

A device for controlling platooning is proposed according to the present disclosure, and the device includes a processor that detects a travel environment state for the platooning, detects weights or loading rates of vehicles to be participating in the platooning, determines an arrangement order of a line of the vehicles of the platooning based on the detected travel environment state and the detected weights or loading rates, and sets a vehicle spacing of the platooning based on the arrangement order, and a communication device for transmitting information on the arrangement order and the vehicle spacing.

Additionally or alternatively, the processor may determine an arrangement of a first vehicle having the highest loading rate among the vehicles to be participating in the platooning based on the detected travel environment state.

Additionally or alternatively, the processor may, when the detected travel environment state exceeds a first criterion, arrange the first vehicle at a head of the platooning, and arrange the remaining vehicles behind the first vehicle in a descending order of the loading rates of the vehicles.

Additionally or alternatively, the processor may, when the detected travel environment state is equal to or lower than a first criterion and exceeds a second criterion, arrange the first vehicle at a center of the platooning, and arrange the remaining vehicles around the first vehicle in a descending order of the loading rates of the vehicles.

Additionally or alternatively, the processor may, when the detected travel environment state is equal to or lower than a second criterion, arrange the first vehicle at a rear of the platooning, and arrange the remaining vehicles in front of the first vehicle in a descending order of the loading rates of the vehicles.

Additionally or alternatively, the vehicle spacing of the platooning may be determined based on a travel speed of the platooning.

Additionally or alternatively, the vehicle spacing of the platooning may be determined based on the detected travel environment state.

Additionally or alternatively, a classification criterion of the detected travel environment state for determining the vehicle spacing may be different from a classification criterion of the detected travel environment state for determining the arrangement order.

Additionally or alternatively, the vehicle spacing of the platooning may be determined based on a loading rate of a following vehicle among two adjacent vehicles.

A method for controlling platooning is proposed according to the present disclosure, and the method includes detecting a travel environment state for the platooning and detecting loading rates of vehicles to be participating in the platooning, determining an arrangement order of a line of the vehicles of the platooning based on the detected travel environment state and the detected loading rates, and setting a vehicle spacing of the platooning based on the arrangement order.

A computer program stored in a computer-readable medium, wherein when the computer program is executed by a computer, the computer program performs controlling the platooning described above is proposed according to the present disclosure. In addition, the computer-readable medium for storing the computer program is proposed.

A vehicle for controlling platooning is proposed according to the present disclosure, and the vehicle includes a processor that detects a travel environment state for the platooning, detects weights or loading rates of vehicles to be participating in the platooning, determines an arrangement order of a line of the vehicles of the platooning based on the detected travel environment state and the detected weights or loading rates, and sets a vehicle spacing of the platooning based on the arrangement order, and a platooning control device including a communication device for transmitting information on the arrangement order and the vehicle spacing.

The above-described solutions of the present disclosure are some of the embodiments of the present disclosure. Various solutions other than the above-described solutions may be derived and understood based on the detailed description of the present disclosure to be described below.

Effects of the present disclosure described above are as follows.

The present disclosure may control to make the platooning safe.

The present disclosure may control the spacing between the vehicles in platooning in various ways depending on the state of the vehicle, the travel environment state, and the like.

The effects of the present disclosure are not limited to the effects described above. Other effects not described above may be understood by those skilled in the art from the description of the present disclosure below.

BRIEF DESCRIPTION OF THE DRAWINGS

The accompanying drawings, which are included as a portion of the detailed description to help understand the present disclosure, provide embodiments of the present disclosure and illustrate the technical idea of the present disclosure together with the detailed description.

DESCRIPTION OF SPECIFIC EMBODIMENTS

Hereinafter, with reference to the accompanying drawings, an embodiment of the present disclosure will be described.

The embodiment to be described below is to help the understanding of the present disclosure. Therefore, the present disclosure is not limited to the embodiments to be described below. In addition, in the accompanying drawings, specific components may be exaggerated or reduced in order to facilitate understanding of the present disclosure. The present disclosure is not limited to a form drawn in the accompanying drawings.

Figure 1:
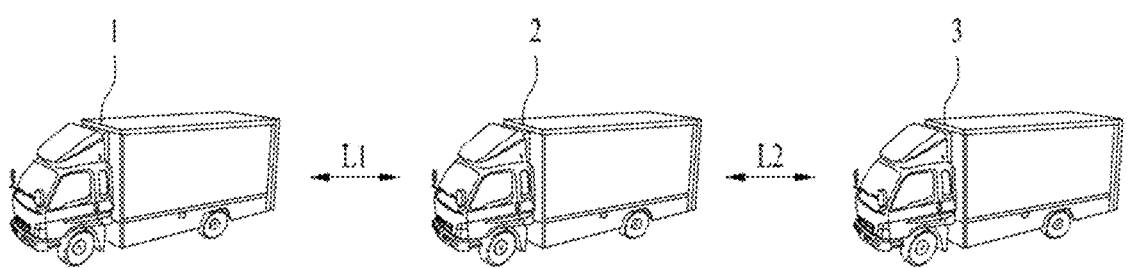
FIG. 1 shows an example of platooning according to the present disclosure.

FIG. 1 shows an example of platooning according to the present disclosure. In FIG. 1, only a vehicle 1 1, a vehicle 2 2, and a vehicle 3 3 are shown, but the number of vehicles participating in the platooning is not limited. Spacings L1 and L2 between the vehicles may be the same as a preset value or may be different from each other.

Control of the platooning according to the present disclosure may be performed by transmitting a control command to each of the vehicles 1, 2, and 3 via a central server 300. Alternatively, the control of the platooning according to the present disclosure may be performed as a control command is transmitted to one of the vehicles participating in the platooning via the central server 300 and the vehicle that has received the control command transmits the control command to the remaining vehicles. In this connection, communication between the vehicles may use a vehicle to vehicle (V2V) communication scheme.

Figure 2:
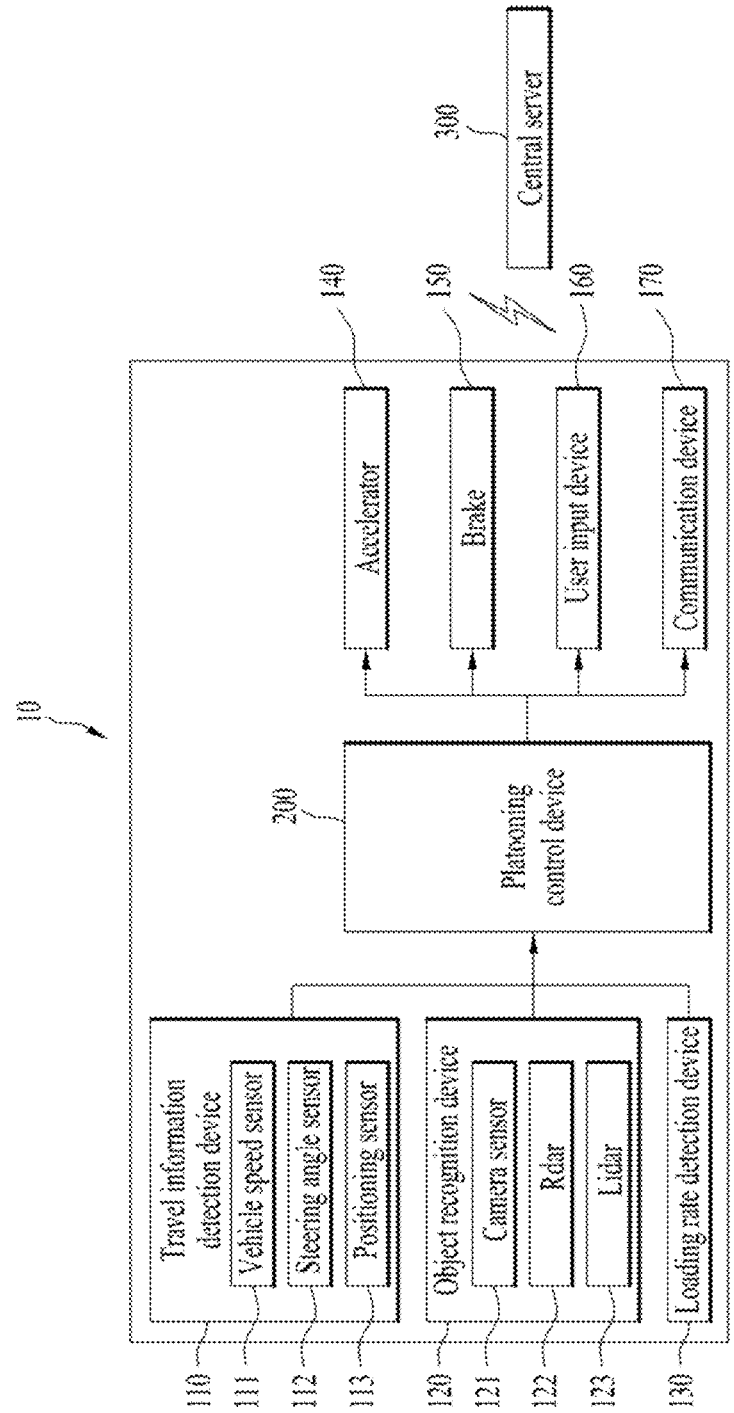
FIG. 2 shows a system 10 for controlling platooning according to the present disclosure.

FIG. 2 shows a system 10 for controlling platooning according to the present disclosure. Such system 10 may be understood to exist in each of all vehicles participating in the platooning. The system 10 may include a travel information detection device 110, an object recognition device 120, a loading rate detection device 130, an accelerator 140, a brake 150, a user input device 160, a communication device 170, and a platooning control device 200. In addition, the system 10 may communicate with the central server 300 to receive information for the platooning, such as a travel environment state (e.g., a road surface condition, a line-of-sight distance condition, or the like), a platooning speed, and/or a vehicle spacing information based on the travel environment state and transmit control information for the platooning, for example, the platooning speed or the vehicle spacing information.

The travel information detection device 110 may include a vehicle speed sensor 111, a steering angle sensor 112, and a positioning sensor 113. The vehicle speed sensor 111 may sense a travel speed of the vehicle, the steering angle sensor 112 may sense a steering angle formed based on manipulation of a steering wheel, and the positioning sensor 110 may include a global positioning system (GPS) receiver and obtain GPS coordinates of the vehicle via the GPS receiver.

The object recognition device 120, which is for recognizing surrounding objects of the vehicle, may include at least one of a camera sensor 121, a radar sensor 122, and a lidar sensor 123.

The camera sensor 121 may detect the surrounding objects outside the vehicle by imaging surroundings of the vehicle, and may detect surrounding objects located within a set distance, a set vertical field of view, and a set horizontal field of view predefined based on a specification thereof. The camera sensor 121 may include a front camera sensor, a left camera sensor, a right camera sensor, and a rear camera sensor respectively installed on a front face, a left-side face, a right-side face, and a rear face of the vehicle, but installed locations and the number of installed camera sensors are not limited to a specific embodiment. A controller (not shown) of the vehicle may determine a position (including a distance to the corresponding object), a speed, a moving direction, and the like of the corresponding object by applying predefined image processing to an image captured via the camera sensor 121.

In addition, an internal camera sensor for imaging an interior of the vehicle may be mounted at a predetermined position (e.g., a rearview mirror) inside the vehicle, and the controller (not shown) of the vehicle may monitor a behavior and a state of an occupant based on the image acquired via the internal camera sensor to output a guide or warning to the occupant via an output device inside the vehicle.

The radar sensor 122 may emit an electromagnetic wave to the surroundings of the vehicle and receive a signal that is reflected from the corresponding object and returned to detect the surrounding objects outside the vehicle, and may detect the surrounding objects located within the set distance, the set vertical field of view, and the set horizontal field of view predefined based on a specification thereof. The radar sensor 122 may include a front radar sensor, a left radar sensor, a right radar sensor, and a rear radar sensor respectively installed on the front face, the left-side face, the right-side face, and the rear face of the vehicle, but installed locations and the number of installed radar sensors are not limited to a specific embodiment. The controller (not shown) of the vehicle may determine the position (including the distance to the corresponding object), the speed, and the moving direction of the corresponding object in a scheme of analyzing power of the electromagnetic wave transmitted and received via the radar sensor 122.

The lidar sensor 123 may transmit a laser signal to the surroundings of the vehicle and receive the signal that is reflected from the corresponding object and returned to detect the surrounding objects outside the vehicle, and may detect the surrounding objects located within the set distance, the set vertical field of view, and the set horizontal field of view predefined based on a specification thereof. The lidar sensor 123 may include a front lidar sensor, a top lidar sensor, and a rear lidar sensor respectively installed on the front face, a top face, and the rear face of the vehicle, but installed locations and the number of installed lidar sensors are not limited to a specific embodiment. A threshold value for determining validity of the laser signal reflected from the corresponding object and returned may be stored in advance in a memory (not shown) of the controller (not shown) of the vehicle, and the controller (not shown) of the vehicle may determine the position (including the distance to the corresponding object), the speed, and the moving direction of the corresponding object in a scheme of measuring a time the laser signal transmitted via the lidar sensor 123 is reflected from the corresponding object and returned.

In addition to the camera sensor 121, the radar sensor 122, and the lidar sensor 123, the object recognition device 120 may further include an ultrasonic sensor. In addition, various types of sensors for detecting the surrounding objects of the vehicle may be further employed in the object recognition device 120.

The loading rate detection device 130 is for detecting a loading rate of a loading box of the vehicle. In addition, the loading rate detection device 130 may detect a weight of a load loaded in the loading box of the vehicle. Each vehicle is equipped with the loading rate detection device 130, so that each vehicle may detect the loading rate and may transmit loading rate information via the communication device 170 to another vehicle or the central server 300 for controlling the platooning according to the present disclosure.

The accelerator 140 may include an engine control unit or a vehicle control unit depending on whether the vehicle is an internal combustion engine-driven vehicle or an electric motor-driven vehicle. The engine control unit may control the speed and an acceleration of the vehicle by increasing or decreasing fuel supplied to an engine. The vehicle control unit may control an output of a motor control unit (an inverter) via a torque control command of a driving motor to control the speed and the acceleration of the vehicle via rotation speed control of the driving motor. The vehicle control unit may also control a regenerative brake, so that the vehicle control unit may calculate a hydraulic braking amount and a regenerative braking requested amount and control the output of the motor control unit (the inverter) to reduce the rotation speed of the driving motor. Therefore, the speed and the acceleration of the vehicle may also be reduced.

The brake 150 may control braking of the vehicle by adjusting a braking force of the vehicle. In the case of the electric motor-driven vehicle, as described above, the hydraulic braking amount and the regenerative braking requested amount are calculated from values input via a brake pedal sensor of the brake 150 to control the braking of the vehicle.

The user input device 160 may include a control panel including a navigation terminal mounted on the vehicle, a smart device possessed by the occupant, and the like, and a user (a driver, the occupant, and the like of the vehicle) may input driving information (a travel destination and the like) via such control panel and may input setting of the platooning according to the present disclosure, transmission or acceptance of a request, or the like.

The communication device 170 may perform vehicle-to-vehicle (V2V) communication and may transmit and receive the platooning-related information, the travel environment state-related information, and the like from the central server 300.

The platooning control device 200, which is for controlling the platooning according to the present disclosure, may control the platooning via determination of a vehicle arrangement for the platooning, setting of the vehicle spacing, instruction or command transmission of the setting, and the like. In addition, the platooning control device 200 may control the speed and the vehicle spacing of the vehicle by controlling the accelerator 140, the brake 150, the object recognition device 120, and the like for the platooning according to the present disclosure.

The platooning control device 200 may use the loading rate (a loading weight, a total vehicle weight, or the like) of the loading box of each vehicle participating in the platooning and the travel environment state-related information for the determination of the vehicle arrangement and the setting of the vehicle spacing.

A specific configuration or operation of the platooning control device 200 according to the present disclosure will be described with reference to FIGS. 3 and 4.

Figure 3:
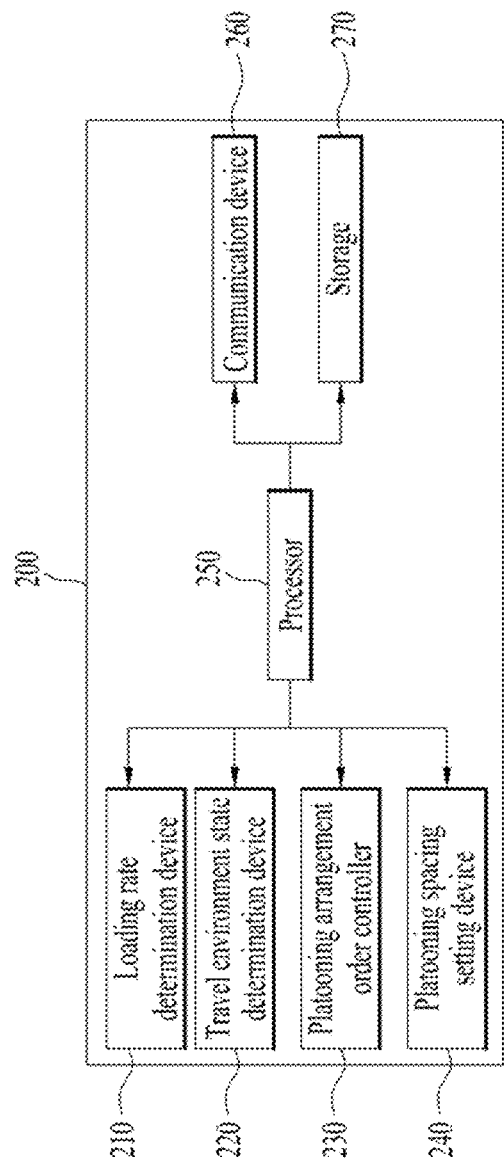
FIG. 3 shows a block diagram of a platooning control device 200 according to the present disclosure.

FIG. 3 shows a block diagram of the platooning control device 200 according to the present disclosure.

The platooning control device 200 may include a loading rate determination device 210, a travel environment state determination device 220, a platooning arrangement order controller 230, a platooning spacing setting device 240, a processor 250, a communication device 260, and storage 270.

Before describing each component of the platooning control device 200, a configuration or an operation of the present disclosure to be described later may be a procedure after a platooning system is activated. Therefore, the present disclosure assumes that the platooning system is activated. The driver or the occupant of each vehicle may input the setting of the platooning according to the present disclosure, the transmission or the acceptance of the request, or the like via the user input device 160. Accordingly, the platooning system may be activated.

The loading rate determination device 210 may detect the loading rate of the vehicle via the loading rate detection device 130. In addition, the loading rate determination device 210 may detect the loading rates for all of the vehicles to be participating in the platooning, as well as vehicles in which the platooning control device 200 is installed or included. Information on the loading rate of another vehicle may be obtained from another vehicle via the communication device 170, or via the central server 300.

In one example, the loading rate determination device 210 may be configured such that each vehicle participating in the platooning only determines and detects the loading rate thereof according to an embodiment. In this regard, when the loading rate of another vehicle is required, the loading rate information of another vehicle may be provided via another vehicle or the central server 300.

As described above, instead of the loading rate of the vehicle, the weight of the load or the total weight of the vehicle including the load may be detected. In a following description, instead of the loading rate, the weight of the load or the total weight of the vehicle including the load may be used for the present disclosure.

The travel environment state determination device 220 may detect, for example, travel environment state information stored in a weather forecast database via the central server 300. Herein, the travel environment state means an environment state related to the travel of the vehicle, and specifically means state information that may affect a reaction speed for the braking of the driver or the braking force of the vehicle. For example, the travel environment state may include the road surface condition, the line-of-sight distance condition, or the like. In addition, the travel environment determination device 220 may detect the travel environment state-related information from the image acquired via the object recognition device 120, object detection information, and the like. As will be described later, for safety of the platooning, a braking distance of each vehicle is a major consideration, so that it is necessary to determine the travel environment state.

The platooning arrangement order controller 230 may determine an arrangement order of the vehicles participating in the platooning based on the loading rate and the travel environment state respectively detected by the loading rate determination device 210 and the travel environment state determination device 220. Herein, the "arrangement order" or "arrangement order information" of the vehicle may include the arrangement order of the vehicles participating in the platooning and a location of each vehicle or at least a vehicle that will receive such information in the vehicle arrangement. For example, when 5 vehicles participate in the platooning, the arrangement order information may include an arrangement order of the 5 vehicles, that is, which vehicle is to be placed at which location from a leading location to a tailing location, or a location (e.g., an order) of a vehicle that will receive such information within the arrangement of 5 vehicles, and the like. The vehicle arrangement will be described in detail with reference to FIG. 4.

The platooning spacing setting device 240 may set the spacings between the vehicles participating in the platooning. Various embodiments may be applied in relation to the spacings between the vehicles.

As an embodiment, all of the spacings between the vehicles may be equal to each other. For example, when the 5 vehicles participate in the platooning, all of the spacings between the vehicles may be determined to be the same preset distance.

As another embodiment, the spacing between two of the vehicles may be set differently. As a specific scheme of the present embodiment, the vehicle spacing may be set differently based on the travel speed of the platooning and the loading rate or the travel environment state of the vehicle.
(1) Travel Speed The travel speed of the platooning affects the braking distance of the vehicle. This is a part that may be described by the laws of physics. As the travel speed increases, it is necessary to secure a longer braking distance. Therefore, it is necessary to set the vehicle spacing in proportion to the travel speed for safety of the platooning.
(2) Loading Rate (Weight)

The loading rate of the loading box of the vehicle participating in the platooning also affects the braking distance of the vehicle. Therefore, it is necessary to set the vehicle spacing in proportion to the loading rate for the safety of platooning.
(3) Travel Environment State It has been described that the travel environment state may include the road surface condition, the line-of-sight distance condition, or the like. These are all affected by a weather at a time point of travel, that is, a weather condition. The travel environment state may be information equivalent to or related to the weather condition.

The weather conditions are classified into sunny or cloudy weather, weather affected by fine dust or yellow sand, snowy or rainy weather, and the like. Additionally, other weather conditions may be included and some of the above-described conditions may be excluded.

The travel environment state at the time of platooning also affects the braking distance of the vehicle. Because the travel environment state affects the reaction speed of the vehicle's driver for the braking or the road surface condition of the road, it may be seen that the travel environment state eventually affects the braking distance of the vehicle. Therefore, it is necessary to set the vehicle spacing in consideration of the travel environment state for the safety of the platooning.

In more detail, the travel environment state may be illustratively classified as follows by being matched with the road surface condition, the line-of-sight distance condition, and the weather condition.

TABLE 1

| Road surface condition Line-of-sight distance condition | Good (Level 1) | Bad (Level 2) |
| --- | --- | --- |
| Good (Level 1) | Sunny or cloudy weather (C1) | Weather that has just stopped snowing or raining (C2) |
| Bad (Level 2) | Weather with severe fine dust or yellow dust (C3) | Snowy or rainy weather (C4) |

In the road surface conditions, 'Good (Level 1)' refers to a condition in which the braking force of the vehicle may be maximized because there is no wet or icy road surface, and 'Bad (Level 2)' refers to a condition, which is in contrast to 'Good (Level 1)', in which the braking force of the vehicle may not be able to be maximized. In the line-of-sight distance conditions, 'Good (Level 1)' refers to a condition, which is a case in which a line-of-sight distance of the driver of the vehicle is normal, in which there is no difficulty for the driver to recognize the vehicle in front, a flow of the vehicles on the road, or a situation around the road, and 'Bad (Level 2)' refers to a condition, which is in contrast to 'Good (Level 1)', in which it is difficult for the driver to secure the line-of-sight distance for safe driving of the vehicle. However, the road surface condition or the line-of-sight distance condition described with reference to Table 1 is an example, and various conditions are able to be further added. In general, the road surface condition and the line-of-sight distance condition may be respectively set to have n and m levels (n and m are integers equal to or greater than 1). In addition, the road surface condition and the line-of-sight distance condition may be expressed quantitatively. For example, the road surface condition may be quantified via a slip ratio and the like and may be set to have the n levels, and the line-of-sight distance condition may use the line-of-sight distance in meters and may be set to have the m levels.

In addition, one of the road surface condition and the line-of-sight distance condition described with reference to Table 1 may be used as the travel environment state.

The platooning spacing setting device 240 may set the vehicle spacing based on the travel speed of the platooning and the loading rate or the travel environment state of the vehicle described above. For example, setting shown in the table below may be performed.

TABLE 2

Vehicle spacing based on loading rate (unit: meters)

| Speed (km/h) | Loading rate equal to or lower than 30% | Loading rate higher than 30% and equal to or lower than 60% | Loading rate higher than 60% |
|---|---|---|---|
| 30 | 20 | 30 | 40 |
| 40 | 20 | 30 | 40 |
| 50 | 25 | 35 | 45 |
| 60 | 30 | 40 | 50 |
| 70 | 40 | 50 | 60 |
| 80 | 45 | 55 | 65 |
| 90 | 50 | 60 | 70 |
| 100 | 60 | 70 | 80 |

The speed of Table 2 refers to the travel speed of the platooning, which may be a set speed input via the user input device 160 or the central server 300. The present disclosure may be extended to a speed region or a speed value not described in Table 2. Table 2 describes that the vehicle spacing is set based on the speed of the platooning and the loading rate of the vehicle. When additionally reflecting the travel environment state to the vehicle spacing, the travel environment state may be added in a form of applying a 'weight'.

To this end, at least one of the road surface condition and the line-of-sight distance condition may be used to indicate the travel environment state. The travel environment state may be divided into k ranges, and k−1 criteria (or reference values) for classifying the travel environment state into the k ranges may be set (k is an integer equal to or greater than 2). Therefore, for example, when k=2, a first weight may be applied when the travel environment state exceeds a preset criterion and a second weight may be applied when the travel environment state is equal to or lower than the preset criterion.

For example, referring to the travel environment state represented in Table 1, it is assumed that the travel environment state is divided into total three ranges and an order of good to worst is C1>C2=C3>C4. When the 'weight' based on the travel environment state is reflected in the vehicle spacing, the vehicle spacing in Table 2 may be applied in a state C1 in which both the road surface condition and the line-of-sight distance condition are good (that is, in this case, the weight is 1 times or 100%), and a weight (e.g., 1.2 times or 120%) may be applied to the vehicle spacing in Table 2 in a state C2 in which the road surface condition is 'bad' and the line-of-sight distance condition is 'good'. In addition, the weight (e.g., 1.2 times or 120%) may be applied to the vehicle spacing in Table 2 in a state C3 in which the road surface condition is 'good' and the line-of-sight distance condition is 'bad'. In addition, a weight (e.g., 1.4 times or 140%) may be applied to the vehicle spacing in Table 2 in a state C4 in which the road surface condition is 'bad' and the line-of-sight distance condition is 'bad'. In this regard, specific values of the weights and a magnitude relationship between the weights exemplified in the respective states are all illustrative.

Because the state C1 in which the road surface condition and the line-of-sight distance condition are both good is a state in which the braking distance of the vehicle is the shortest, a weight greater than 1 times or 100% will be applied for all other travel environment states.

In addition, the vehicle spacing shown in Table 2 may be set based on a following vehicle among two vehicles traveling adjacently. That is, among the vehicles participating in the platooning, a vehicle spacing determined by a loading rate of a second vehicle adjacent to the leading vehicle may be determined as a spacing between the leading vehicle and the second vehicle. A vehicle spacing between the second vehicle and a third vehicle may be determined as a vehicle spacing determined by a loading rate of the third vehicle. The vehicle spacing may be determined in the same manner for the remaining vehicles participating in the platooning. The travel speed of the platooning and the travel environment state will be the same for all of the vehicles participating in the platooning.

In summary, the platooning spacing setting device 240 may set a reference vehicle spacing based on the travel speed of the platooning or the loading rate of the vehicle described above. Additionally, a final vehicle spacing may be set by applying the weight based on the travel environment state to the reference vehicle spacing.

In one example, the travel environment state (that is, the 'weight') affects the vehicle spacing of the platooning, which is a major issue related to the safety. Therefore, the weight for determining the vehicle spacing should be applied equally to all of the vehicles participating in the platooning. To this end, the platooning control device 200 or the travel environment state determination device 220 of the present disclosure should make the weights for determining the vehicle spacing to coincide with each other in a scheme of exchanging information with or instructing the platooning control device or the travel environment state determination device of another vehicle.

For example, the platooning control device 200 or the travel environment state determination device 220 of one of the vehicles participating in the platooning may determine the weight for determining the vehicle spacing described above, and may transmit the weight to another vehicle directly via the V2V communication or via the central server 300. In this case, the remaining vehicles participating in the platooning must use the received weight as it is.

The processor 250 may control an operation of or issue a command to the loading rate determination device 210, the travel environment state determination device 220, the platooning arrangement order controller 230, the platooning spacing setting device 240, the communication device 250, the storage 260, and the like. In addition, the processor 250 may receive the information for the platooning from the loading rate determination device 210, the travel environment state determination device 220, the platooning arrangement order controller 230, the platooning spacing setting device 240, the communication device 260, the storage 270, and the like. In addition, the processor 250 may receive the information from another device in the vehicle via the communication device 260.

Using the received information, the processor 250 may process the information for the platooning, and store the processed information in the storage 270. In addition, the processor 250 may control such that the processed information is transmitted to another vehicle or the central server 300. For example, the processor 250 may transmit the information related to the platooning, that is, the vehicle arrangement order and the vehicle spacing or the travel speed of the platooning, to another vehicle or the central server 300. In this regard, the arrangement order of the line of the vehicles may include not only the overall vehicle arrangement, but also a location within the line of the vehicles of a vehicle that has received the arrangement order. In addition, the vehicle spacing may include the weight for determining the vehicle spacing. That is, the processor 250 may allow the information described in Table 2; when necessary, the weight for determining the vehicle spacing; to be transmitted to another vehicle or the central server 300.

The communication device 260 may provide a function for performing communication with another component in the vehicle for controlling the platooning according to the present disclosure. The storage 270 may store the information for controlling the platooning according to the present disclosure.

In one example, although the individual components of the platooning control device 200 have been described in detail in FIG. 3, various determinations, decisions, controls, and the like related to the platooning may be directly performed by the processor 250. That is, the loading rate determination device 210, the travel environment state determination device 220, the platooning arrangement order controller 230, and the platooning spacing setting device 240 may be integrated into the processor 250.

Figure 4:
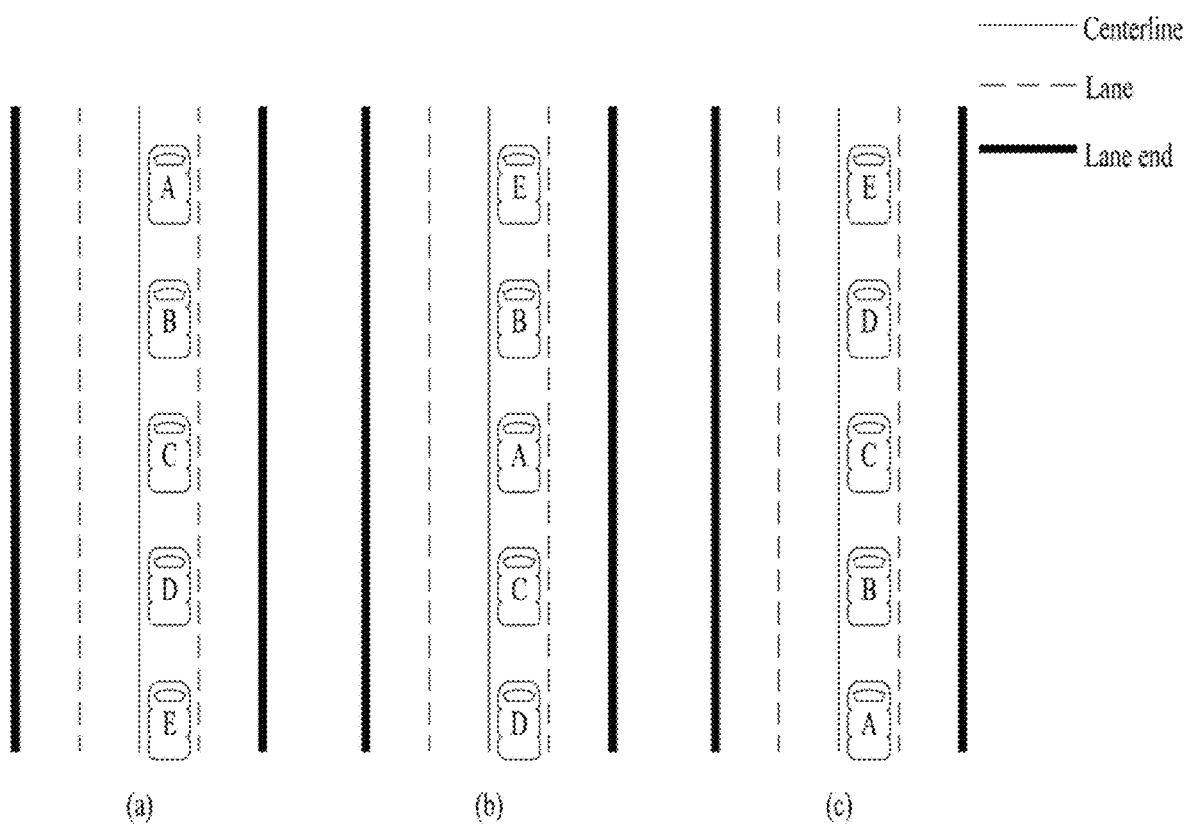
FIG. 4 shows an example of a vehicle arrangement for platooning according to the present disclosure.

FIG. 4 shows an example of a vehicle arrangement for platooning according to the present disclosure. (a) is a state in which the weather condition is the sunny weather, which corresponds to the state C1 in which both the road surface condition and the line-of-sight distance condition are at the level 1 referring to Table 1. (b) is a state in which the weather condition is a weather with the poor line-of-sight distance, which corresponds to the states C3 and C4 in which the line-of-sight distance condition is at the level 2 referring to Table 1. (c) is a state in which the weather condition is the snowy or rainy weather or the weather that has just stopped snowing or raining, which corresponds to the states C2 and C4 in which the road surface condition is at the level 2 referring to Table 1. In addition, an upper end in FIG. 4 corresponds to a progress direction of the platooning.

An arrangement in (a) in FIG. 4 will be described. When the weather condition is the sunny weather (e.g., the state C1 in Table 1), the road surface condition and a sight condition will be good, so that it is only necessary to consider the braking distance based on the loading rate of the vehicle. The heavier the vehicle, the longer the braking distance, so that a likelihood of the accident may be reduced when the vehicles are arranged in an order of heaviness from a head of the platoon. Therefore, a vehicle A with the greatest weight may be arranged at the head, vehicles B, C, D, and E may be arranged in an order of the weight. In the example in FIG. 4, it is assumed that the loading rates of the vehicles are A>=B>=C>=D>=E. However, it is unlikely that all of the vehicles participating in the platooning will have the same loading rate.

(b) in FIG. 4 shows an arrangement when the weather condition is the weather with the poor line-of-sight distance. In adverse conditions in which visibility is not secured (e.g., the state C3 or C4 in Table 1), when the heavy vehicle is placed at the head, as the vehicle braking is not controlled quickly in an emergency situation that suddenly occurs, a collision with a following vehicle may occur. In addition, in a case in which the heavy vehicle is placed at the rear, when a vehicle traveling following the platooning vehicles collides with a rear of the platooning vehicle, secondary damage caused by a chain collision, falling of the load, or the like is a concern. Therefore, the higher the loading rate, the closer the vehicle is to a center of the platoon to prepare for various situations. Accordingly, E, B, A, C, and D may be arranged in an order from the head of the platoon.

(c) in FIG. 4 shows an arrangement when the weather condition is the snowy or rainy weather. As the weight of the vehicle increases, in the snowy or rainy environment or the environment that has just stopped snowing or raining (e.g., the state C2 or C4 in Table 1), that is, in the state in which the road surface condition is not good, a grip (a friction) with the road may be increased, and thus, a traction may be good, so that the braking distance may be shorter than that of the light vehicle. In addition, control of the vehicle may be easier than that of the light vehicle because the traction is good. Conversely, because the light vehicle has a long braking distance and it is relatively difficult to control the light vehicle, the closer the light vehicle is to the rear of the platoon, the higher the probability of collision with a vehicle ahead in the platoon. Therefore, the vehicles may be arranged in the order of heaviness from the rear of the platoon, and eventually, the vehicles may be arranged in an order of E, D, C, B, and A from the head of the platoon.

Because the platooning usually involves vehicles of the same model or class, the loading rate of the loading box may mean the total weight of the vehicle. Therefore, as described above, the loading rate of the present specification may be replaced with the total weight of the vehicle or the weight of the load loaded in the loading box.

In addition, it has been described that the travel environment state composed of the road surface condition or the line-of-sight distance condition illustrated in Table 1 is used for determining the vehicle arrangement order and determining the vehicle spacing. To this end, in the description above, the classification criteria of the travel environment states for the determination of the vehicle arrangement order and the classification criteria of the travel environment states for determining the vehicle spacing were applied differently. In summary, in determining the vehicle arrangement order, the three travel environment states of C1, C3 or C4, and C2 or C4 in Table 1 were distinguished from each other, but, in determining the vehicle spacing, the three travel environment states of C1, C2 or C3, and C4 in Table 1 were distinguished from each other. However, the same classification criteria may be used for the travel environment states for the determination of the vehicle arrangement order and for the determination of the vehicle spacing. For example, two sets of {C1} and {C2, C3, C4} in Table 1 may be constructed, and the same weight for determining the vehicle arrangement order and the vehicle spacing may be applied to each set.

Figure 5:
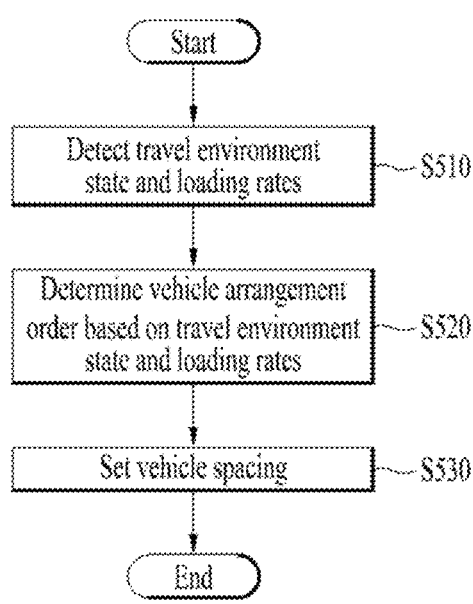
FIG. 5 shows a flowchart of a method for controlling platooning according to the present disclosure.

FIG. 5 shows a flowchart of a method for controlling platooning according to the present disclosure. The method may be performed by the platooning control device 200 or the component (e.g., the processor 250) of the platooning control device 200 described above.

The platooning control device 200 or the processor 250 may detect the travel environment state for the platooning and the loading rates of the vehicles to be participating in the platooning (S510). The loading rates of other vehicles may be obtained via the corresponding vehicles or the central server 300.

The platooning control device 200 or the processor 250 may determine the arrangement order of the line of the vehicles of the platooning based on the detected travel environment state and the detected loadage (S520).

The platooning control device 200 or the processor 250 may determine arrangement of a first vehicle having the highest loading rate among the vehicles to be participating in the platooning based on the detected travel environment state. That is, the platooning control device 200 or the processor 250 may first determine a location of the heaviest vehicle in the line of the vehicles.

Then, when the detected travel environment state exceeds a first criterion (e.g., C1 in Table 1), the platooning control device 200 or the processor 250 may arrange the first vehicle at the head of platooning, and arrange the remaining vehicles behind the first vehicle in a descending order of the loading rates of the vehicles.

Alternatively, when the detected travel environment state is equal to or lower than the first criterion and exceeds a second criterion (e.g., C2 or C3 in Table 1), the platooning control device 200 or the processor 250 may arrange the first vehicle at the center of the platooning, and arrange the vehicles in the descending order of the loading rates of the vehicles around the first vehicle.

Alternatively, when the detected travel environment state is equal to or lower than the second criterion (e.g., C4 in Table 1), the platooning control device 200 or the processor 250 may arrange the first vehicle at the rear of the platooning, and arrange the vehicles in front of the first vehicle in the descending order of the loading rates of the vehicles.

The platooning control device 200 or the processor 250 may set the vehicle spacing of the platooning (S530). As described above, the vehicle spacing may be determined based on at least one of the travel speed of the platooning, the loading rate of the vehicle, and the travel environment state. When the loading rate of the vehicle is used to determine the vehicle spacing, the vehicle spacing of the platooning may be determined based on the loading rate of the following vehicle among the two adjacent vehicles. In one example, the vehicle spacing of the platooning may be determined as a preset value.

The platooning control device 200 or the processor 250 may transmit the information on the arrangement order, the vehicle spacing, or the travel speed of the vehicle for the platooning to another vehicle or the central server 300.

The present disclosure has been described that the platooning control device 200 determines the control information for the platooning as described above in Table 2, the "vehicle arrangement order", and the like, and transmits those to another vehicle or the central server 300. When necessary, the travel speed of the platooning must also be transmitted to another vehicle or the central server 300. The remaining vehicles that have received the control information for the platooning directly or via the central server 300 may perform the platooning using the object recognition device 120, the accelerator 140, the brake 150, and the like via the platooning control devices 200 thereof.

As another embodiment of the present disclosure, setting information for the platooning as described in Table 2 may be provided in advance to candidate vehicles that may participate in the platooning. According to the present embodiment, because each vehicle has the loading rate detection device 130, there is no need to separately receive the loading rate. In addition, when the platooning is to follow the leading vehicle with the vehicle spacing without setting the travel speed of the platooning separately (for example, when using a smart cruise control (SCC) function), there is also no need to receive the travel speed of the platooning. However, the travel environment state information (or the 'weight' for determining the vehicle spacing) must be the same for all of the vehicles participating in the platooning as described above, so that the travel environment state information must be received from one vehicle (referred to as a 'control vehicle') participating in the platooning or the central server 300. In addition, the "vehicle arrangement order" must also be received from the control vehicle or the central server 300. That is, for example, information on one of (a) to (c) shown in FIG. 4 and which vehicle I correspond to among the vehicles A to E should be received.

Accordingly, the platooning control device 200 or the travel environment state determination device 220 of the control vehicle may transmit the 'weight' for determining the vehicle spacing and the "vehicle arrangement order" to another vehicle. Other vehicles that have received the 'weight' for determining the vehicle spacing and the "vehicle arrangement order" may perform control for the platooning with reference to the control information as in Table 2 provided in advance via the platooning control devices 200 thereof.

The descriptions of FIGS. 1 to 4 above, which are not made in relation to the method shown in FIG. 5, may be applied to the method in FIG. 5.

Hereinabove, the "device" and the components belonging thereto (the loading rate determination device 210, the travel environment determination device 220, the platooning arrangement order controller 230, the platooning spacing setting device 240, the processor 250, the communication device 260, the storage 270, and the like) have been described as carrying out the invention, but the "device" and the components belonging thereto are names only, and the scope of rights is not subordinated thereto.

That is, the present disclosure may be performed with a name other than the device. In addition, the method, scheme, or the like described above may be performed by software or codes readable by a computer or other machine or device for controlling the platooning.

In addition, as another aspect of the present disclosure, the proposal or the operation of the invention described above may be provided as codes that may be implemented, realized, or executed by a "computer" (a generic concept including a system on chip (SoC) or a (micro) processor) or a computer-readable storage medium, a computer program product, or the like storing or containing the codes. The scope of the present disclosure is extendable to the codes or the computer-readable storage medium or the computer program product storing or containing the codes.

In addition, as another aspect of the present disclosure, the proposal or the operation of the invention described above, or the device (e.g., the platooning control device) for performing the same may be provided included in the "vehicle". Although the truck was mentioned in the description above, the vehicle type does not matter for the vehicle 1 according to the present disclosure.

Detailed descriptions of preferred embodiments of the present disclosure disclosed as described above have been provided such that those skilled in the art may implement and realize the present disclosure.

Although the description has made with reference to preferred embodiments of the present disclosure, it will be understood by those skilled in the art that various modifications and changes may be made to the present disclosure set forth in the claims below.

Accordingly, the present disclosure is not intended to be limited to the embodiments described herein, but is intended to accord the widest scope consistent with the principles and novel features disclosed herein.

What is claimed is:

1. A device for controlling platooning, the device comprising:
    a processor configured to:
    determine a travel environment state for the platooning based on a combination of weather information, road surface condition and line-of-sight distance condition;
    detect weights or loading rates of vehicles participated in the platooning;

determine an arrangement order of a line of the vehicles participated in the platooning based on one state of a first set of states corresponding to the determined travel environment state and the detected weights or loading rates; and set a vehicle spacing of the platooning by determining a weight value of one state of a second set of states corresponding to the determined travel environment state and applying the weight value to a reference vehicle spacing based on the arrangement order; and a communication device for transmitting information on the arrangement order and the vehicle spacing and the weight value to the vehicles participated in the platooning, wherein the first set of states includes at least three states among four predetermined travel environment states, the second set of states includes at least three states among the four predetermined travel environment states, the first set of states is different from the second set of states.

2. The device of claim 1, wherein the processor is configured to determine an arrangement of a first vehicle having a highest loading rate among the vehicles to be participating in the platooning based on the determined travel environment state.

3. The device of claim 2, wherein the processor is configured to, when the determined travel environment state exceeds a first criterion, arrange the first vehicle at a head of the platooning, and arrange the remaining vehicles behind the first vehicle in a descending order of the loading rates of the vehicles.

4. The device of claim 2, wherein the processor is configured to, when the determined travel environment state is equal to or lower than a first criterion and exceeds a second criterion, arrange the first vehicle at a center of the platooning, and arrange the remaining vehicles around the first vehicle in a descending order of the loading rates of the vehicles.

5. The device of claim 2, wherein the processor is configured to, when the determined travel environment state is equal to or lower than a second criterion, arrange the first vehicle at a rear of the platooning, and arrange the remaining vehicles in front of the first vehicle in a descending order of the loading rates of the vehicles.

6. The device of claim 1, wherein the vehicle spacing of the platooning is determined based on a travel speed of the platooning.

7. The device of claim 1, wherein the vehicle spacing of the platooning is determined based on a loading rate of a following vehicle among two adjacent vehicles.

8. A method for controlling platooning, the method comprising:

determining a travel environment state for the platooning based on a combination of weather information, road surface condition and line-of-sight distance condition;

detecting loading rates of vehicles participated in the platooning;

determining an arrangement order of a line of the vehicles participated in the platooning based on one state of a first set of states corresponding to the determined travel environment state and the detected loading rates;

setting a vehicle spacing of the platooning by determining a weight value of one state of a second set of states corresponding to the determined travel environment state and applying the weight value to a reference vehicle spacing based on the arrangement order; and transmitting the weight value to the vehicles participated in the platooning, wherein the first set of states includes at least three states among four predetermined travel environment states, the second set of states includes at least three states among the four predetermined travel environment states, the first set of states is different from the second set of states.

9. A vehicle for controlling platooning, the vehicle comprising:

a processor configured to:

determine a travel environment state for the platooning based on a combination of weather information, road surface condition and line-of-sight distance condition;

detect weights or loading rates of vehicles to participated in the platooning;

determine an arrangement order of a line of the vehicles participated in the platooning based on one state of a first set of states corresponding to the determined travel environment state and the detected weights or loading rates; and set a vehicle spacing of the platooning by determining a weight value of one state of a second set of states corresponding to the determined travel environment state and applying the weight value to a reference vehicle spacing based on the arrangement order; and a platooning control device including a communication device for transmitting information on the arrangement order and the vehicle spacing and the weight value to the vehicles participated in the platooning, wherein the first set of states includes at least three states among four predetermined travel environment states, the second set of states includes at least three states among the four predetermined travel environment states, the first set of states is different from the second set of states.

10. The method of claim 8, wherein determining an arrangement of a first vehicle having a highest loading rate among the vehicles to be participating in the platooning based on the determined travel environment state.

11. The method of claim 10, wherein when the determined travel environment state exceeds a first criterion, arranging the first vehicle at a head of the platooning, and arranging the remaining vehicles behind the first vehicle in a descending order of the loading rates of the vehicles.

12. The method of claim 10, wherein when the determined travel environment state is equal to or lower than a first criterion and exceeds a second criterion, arranging the first vehicle at a center of the platooning, and arranging the remaining vehicles around the first vehicle in a descending order of the loading rates of the vehicles.

13. The method of claim 10, wherein when the determined travel environment state is equal to or lower than a second criterion, arranging the first vehicle at a rear of the platooning, and arranging the remaining vehicles in front of the first vehicle in a descending order of the loading rates of the vehicles.

14. The vehicle of claim 9, wherein the vehicle spacing of the platooning is determined based on a loading rate of a following vehicle among two adjacent vehicles.

* * * * *